(12) United States Patent
Wilson et al.

(10) Patent No.: US 12,345,575 B2
(45) Date of Patent: Jul. 1, 2025

(54) PHONON DISRUPTORS FOR INCREASED THERMAL RESISTANCE WITHOUT SACRIFICING ELECTRICAL SIGNAL QUALITY IN THERMAL SENSORS

(71) Applicant: U.S. Army Combat Capabilities Development Command, Army Research Laboratory, Adelphi, MD (US)

(72) Inventors: Adam A. Wilson, Columbia, MD (US); Darin J. Sharar, Silver Spring, MD (US); Gabriel L. Smith, Ellicott City, MD (US); Cory R. Knick, Troy, OH (US)

(73) Assignee: America as represented by the Secretary of the Army, Washington, DC (US)

( * ) Notice: Subject to any disclaimer, the term of this patent is extended or adjusted under 35 U.S.C. 154(b) by 1087 days.

(21) Appl. No.: 17/317,211

(22) Filed: May 11, 2021

(65) Prior Publication Data

US 2022/0381623 A1 Dec. 1, 2022

(51) Int. Cl.
*G01K 7/16* (2006.01)
*G01J 5/02* (2022.01)
*G01J 5/04* (2006.01)
*G01J 5/20* (2006.01)
*G01K 7/42* (2006.01)

(52) U.S. Cl.
CPC ............... *G01K 7/16* (2013.01); *G01J 5/023* (2013.01); *G01J 5/024* (2013.01); *G01J 5/046* (2013.01); *G01J 5/20* (2013.01); *G01K 7/42* (2013.01)

(58) Field of Classification Search
CPC .. G01J 5/023; G01J 5/046; G01J 5/024; G01J 5/06; G01J 5/20; G01J 2005/0077; G01J 2005/202; G01K 2213/00; G01K 7/16; G01K 7/42
See application file for complete search history.

(56) References Cited

U.S. PATENT DOCUMENTS

| 6,690,014 | B1 * | 2/2004 | Gooch | ........................ G01J 5/20 438/96 |
| 7,294,836 | B2 | 11/2007 | Yon et al. | |
| 7,622,717 | B2 * | 11/2009 | Skidmore | ............. G01J 5/0225 250/338.1 |

(Continued)

OTHER PUBLICATIONS

Li, X., et al., "Direct Evidence of Tungsten Clustering in W0.02V0.98O2 Thin Films and its Effect on the Metal-to-Insulator Transition," Acta Materialia, vol. 80, Nov. 2014, pp. 16-24.

(Continued)

*Primary Examiner* — David J Makiya
*Assistant Examiner* — Soorena Kefayati
(74) *Attorney, Agent, or Firm* — Eric B. Compton

(57) ABSTRACT

Sensor interconnects and supports and methods of making them utilize phonon disruptors for increased thermal resistance while maintaining acceptable electrical signal quality in materials. Phonon disruptors include, but are not limited to, structural features such as interfaces, grain boundaries, and point scattering sites, for example, that are designed to scatter heat carriers while allowing electrons to pass through the material. Some embodiments herein involve designing selected stacks of alternating or sequential material pairs within sensor interconnects.

20 Claims, 16 Drawing Sheets

(56) References Cited

U.S. PATENT DOCUMENTS

| | | | | |
|---|---|---|---|---|
| 8,502,147 | B2* | 8/2013 | Petraitis | G01J 5/20 250/332 |
| 2006/0231761 | A1* | 10/2006 | Peytavit | G01J 5/20 250/338.1 |
| 2011/0140224 | A1* | 6/2011 | Kropelnicki | H01L 21/2007 257/E31.093 |
| 2013/0161515 | A1* | 6/2013 | Park | G01J 5/023 250/338.1 |
| 2015/0115160 | A1* | 4/2015 | O'Brien | B81B 7/02 29/832 |
| 2018/0283956 | A1* | 10/2018 | Van Buggenhout | G01J 5/045 |
| 2019/0145829 | A1* | 5/2019 | Sugino | G01J 5/20 374/130 |
| 2020/0166408 | A1 | 5/2020 | Aliane et al. | |
| 2020/0333191 | A1* | 10/2020 | Gelinck | G01J 5/0215 |
| 2021/0302236 | A1* | 9/2021 | Takahashi | G01J 5/22 |
| 2021/0302237 | A1* | 9/2021 | Takahashi | H10F 71/10 |

OTHER PUBLICATIONS

Venkatasubramanian, R., "Lattice thermal conductivity reduction and phonon localizationlike behavior in superlattice structures," Phys. Rev. B, vol. 61, No. 4, Jan. 15, 2000, pp. 3091-3097.

Banik, A., et al., "The origin of low thermal conductivity in Sn1—xSbxTe: phonon scattering via layered intergrowth nanostructures," Energy & Environmental Science, vol. 9, No. 6, Apr. 20, 2016, pp. 2011-2019.

Murphy, D., et al., "High-sensitivity (25-μm pitch) microbolometer FPAs and application development," Proceedings vol. 4369, Infrared Technology and Applications XXVII, Oct. 10, 2001, pp. 222-234.

Kim, W., et al., "Thermal Conductivity Reduction and Thermoelectric Figure of Merit Increase by Embedding Nanoparticles in Crystalline Semiconductors," Phys. Rev. Lett., vol. 96, No. 4, Feb. 2, 2006, pp. 045901-1 to 045901-4.

Davis, B., et al., "Nanophononic Metamaterial: Thermal Conductivity Reduction by Local Resonance," Phys. Rev. Lett., vol. 112, No. 5, Feb. 7, 2014, pp. 055505-1 to 055505-5.

Kohin, M., et al., "Performance limits of uncooled VOx microbolometer focal plane arrays," Proceedings of the SPIE, vol. 5406, Aug. 2004, pp. 447-453.

Zerov, V., et al., "Heat-sensitive materials for uncooled microbolometer arrays," Journal of Optical Technology, vol. 68, No. 12, Dec. 2001, pp. 939-948.

Radford, W., et al., "Sensitivity improvements in uncooled microbolometer FPAs," Proceedings of SPIE—The International Society for Optical Engineering, vol. 3698, Jul. 1999, pp. 119-130.

R. Gurunathan, et al., "Alloy scattering of phonons. Materials Horizons," 7(6), 2020 pp. 1452-1456.

R. G. Delatorre et al., "Thermoelectric properties of electrodeposited CuNi alloys on Si," Journal of applied physics, 93 (10), 2003, pp. 6154-6158.

Y. Terada, et al., "Thermal conductivity of intermetallic compounds with metallic bonding. Materials transactions," 43 (12), 2002. pp. 3167-3176.

G. Chen, Chapter 7: "Classical Size Effects" in Nanoscale energy transport and conversion: a parallel treatment of electrons, molecules, phonons, and photons. Oxford University Press. 2005. pp. 287-288.

S. Mu, et al., Uncovering electron scattering mechanisms in NiFeCoCrMn derived concentrated solid solution and high entropy alloys. npj Computational Materials, 5(1), 2019 pp. 1-8.

Z. Tong, and H. Bao, "Decompose the electron and phonon thermal transport of intermetallic compounds NiAl and Ni3Al by first-principles calculations," International Journal of Heat and Mass Transfer, 117, 2018, pp. 972-977.

D. G. Cahill, "Analysis of heat flow in layered structures for time-domain thermoreflectance,". Review of scientific instruments, 75(12), 2004, pp. 5119-5122.

Warzoha, R.J., Wilson, A.A., Donovan, B.F., Smith, A.N., Vu, N., Perry, T., Li, L., Miljkovic, N. and Getto, E., "A numerical fitting routine for frequency-domain thermoreflectance measurements of nanoscale material systems having arbitrary geometries, " Journal of Applied Physics, 129(3), 2021, p. 035103.

Warzoha, R.J., Vu, N.T., Donovan, B.F., Cimpoiasu, E., Sharar, D.J., Leff, A.C., Wilson, A.A. and Smith, A.N., "Grain growth-induced thermal property enhancement of NiTi shape memory alloys for elastocaloric refrigeration and thermal energy storage systems," International Journal of Heat and Mass Transfer, 154, 2020, p. 119760.

H. Matsumoto, "Irreversibility in transformation behavior of equiatomic nickel-titanium alloy by electrical resistivity measurement," Journal of alloys and compounds, 368(1-2), 2004, pp. 182-186.

Hite, N., Sharar, D.J., Trehern, W., Umale, T., Atli, K.C., Wilson, A.A., Leff, A.C. and Karaman, I., "NiTiHf shape memory alloys as phase change thermal storage materials," Acta Materialia, 218, 2021, p. 117175.

P. Guo, et al., "A review of germanium-antimony-telluride phase change materials for non-volatile memories and optical modulators," Applied sciences, 9(3), 2019, p. 530.

E. A. Scott, et al., "Thermal conductivity of (Ge2Sb2Te5) 1—x C x phase change films," Journal of Applied Physics, 128(15), 2020, p. 155106.

X. Wang, et al., "Thermal modeling of laser-annealing-induced crystallization of amorphous NiTi thin films," Applied Physics A, 90(4), 2008, pp. 689-694.

X. Huang, et al., "Amorphous nickel titanium alloy film: a new choice for cryo electron microscopy sample preparation," Progress in biophysics and molecular biology, 156, 2020, pp. 3-13.

Matweb Material Datasheet for TiN coatings. Accessed on May 4, 2022. URL: https://www.matweb.com/search/datasheet_print.aspx?matguid=ffbf753c500949db95e502e043f9a404.

AZO Materials Datasheet for ASIS 310 Stainless Steel. Accessed on May 4, 2022. URL: https://www.azom.com/article.aspx? ArticleID=4392.

M. Yamasaki, et al., "Thermal diffusivity and conductivity of Zr55Al10Ni5Cu30 bulk metallic glass," Scripta Materialia, 53(1), 2005, pp. 63-67.

U, Harms, et al. "Thermal conductivity of Pd40Ni40—xCuxP20 metallic glasses," Scripta Materialia, 47(6), 2002, pp. 411-414.

Warzoha, R.J., Wilson, A.A., Donovan, B.F., Donmezer, N., Giri, A., Hopkins, P.E., Choi, S., Pahinkar, D., Shi, J., Graham, S. and Tian, "Applications and impacts of nanoscale thermal transport in electronics packaging." Journal of Electronic Packaging, 143(2), 2021, p. 020804.

Non-Final Office Action, U.S. Appl. No. 17/741,185 having a mail date of Oct. 21, 2024.

* cited by examiner

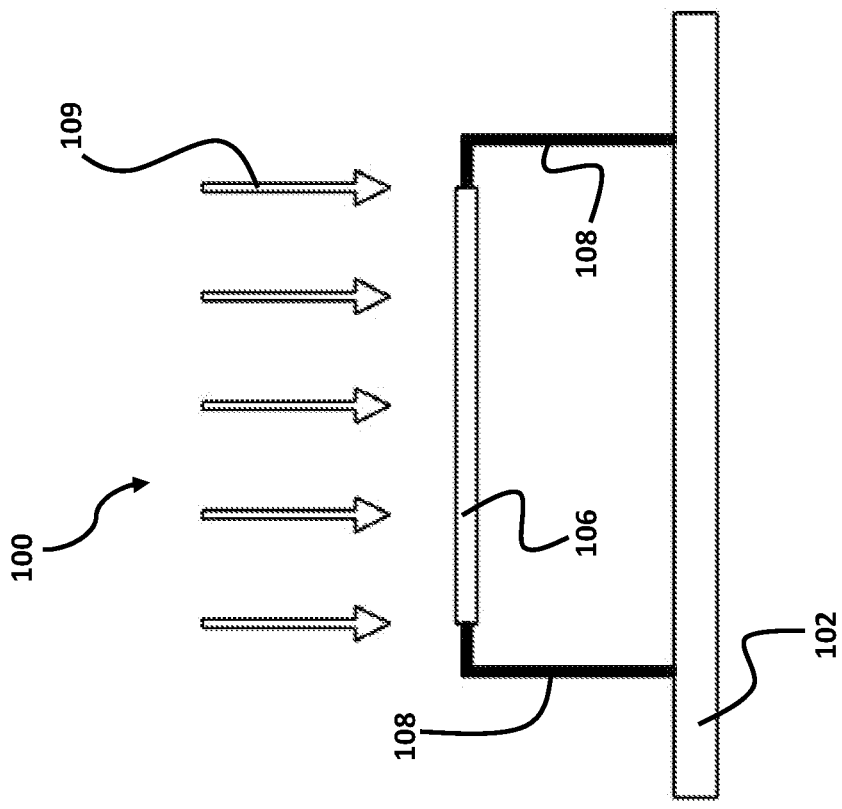
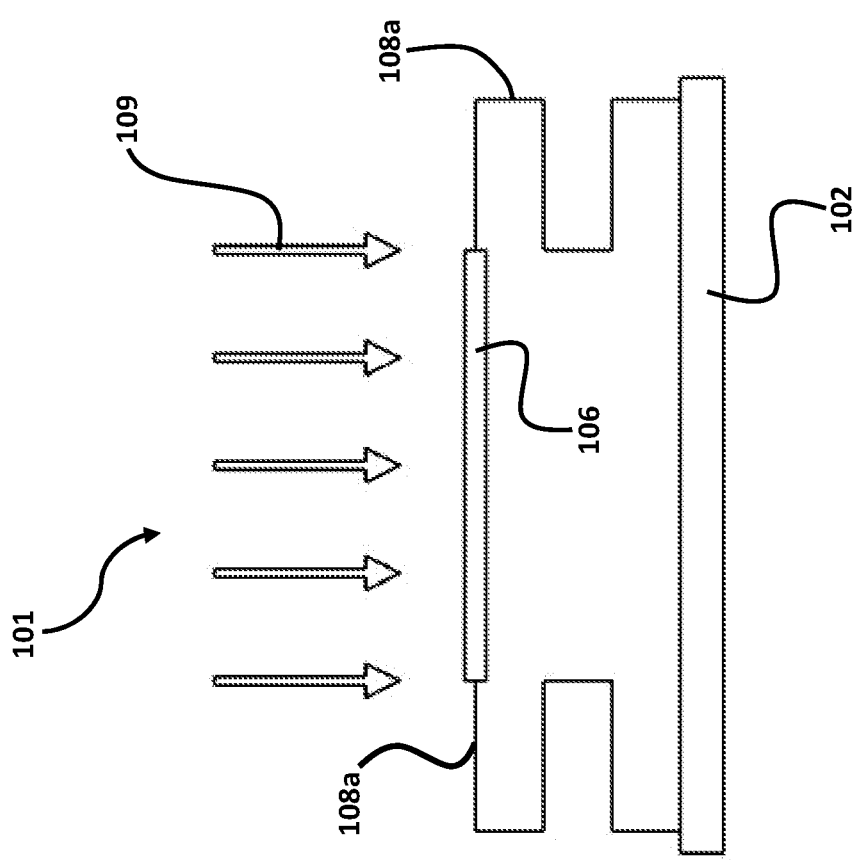

PHONON DISRUPTORS FOR INCREASED THERMAL RESISTANCE WITHOUT SACRIFICING ELECTRICAL SIGNAL QUALITY IN THERMAL SENSORS

GOVERNMENT INTEREST

The embodiments herein may be manufactured, used, and/or licensed by or for the United States Government without the payment of royalties thereon.

BACKGROUND

Technical Field

The embodiments herein generally relate to structures and methods for increasing thermal resistance in thermal sensor mechanical/electrical interconnects while maintaining acceptable electrical signal quality.

DESCRIPTION OF THE RELATED ART

Conventional thermal sensors rely on radiated heat from the environment to be detected at a sensitive detection pixel or microbolometer, which is designed to be thermally isolated from the surrounding packaging and integrated circuit. Arrays of microbolometers are used in thermal imaging devices to form a thermal image detection array, hence the use of detection pixel, or pixel for short, to refer to a microbolometer device. The microbolometer has a detector or sensor element, which has one or more electrical properties, such as resistance or voltage for example, that are temperature dependent. To achieve this, these sensors are generally vacuum packaged to prevent convective losses, and prior art has proposed that the detection pixel be connected to circuitry via long, narrow leg structures. The narrower and longer the leg structures, the more thermal resistance is present in each pixel. As a result, the sensor would be more sensitive to thermal radiation.

Thermal sensors have historically relied on detector elements which are actively cooled to cryogenic temperatures to reduce ambient thermal noise. Active cooling significantly increases operating power demand, adds bulk and expense compared with uncooled alternatives. In the past two decades, uncooled microbolometers have emerged as competitive alternatives, requiring no active cooling and made from materials which significantly reduce cost, size, weight, and operating power requirements.

At present, uncooled microbolometers rely on exclusively geometric control to increase the thermal resistance of the pixel. Increased thermal resistance leads to increased sensitivity (temperature rise), rising as the square root of the thermal resistance. This means that the smallest temperature rise that can be detected by the pixel corresponds to a smaller amount of thermal energy absorbed at the pixel as the thermal resistance of the pixel is increased, thus increasing the thermal resistance of the pixel enhances the sensitivity of the pixel. This is one of the key performance metrics for uncooled microbolometers. More specifically, manufacturers of uncooled microbolometers today rely on adding more length or thinning electrical/mechanical interconnects to add thermal resistance to the interconnects, but this typically compromises mechanical rigidity of the structure. A reduction in mechanical rigidity makes these structures prone to stress-induced deformation and warping, which leads to as-fabricated devices touching down to the substrate (rather than being suspended). The result is an inoperable microbolometer. Thus, there is a need to increase the thermal resistance without requiring thinning or lengthening the structures.

SUMMARY

The embodiments herein utilize phonon disruptors for increased thermal resistance while maintaining acceptable electrical signal quality in materials. Phonon disruptors include, but are not limited to, structural features such as interfaces, grain boundaries, and point scattering sites, for example, that are designed to scatter heat carriers while allowing electrons to pass through the material. Some embodiments herein involve designing selected stacks of alternating or sequential material pairs within sensor interconnects.

Existing sensors have used standard homogeneous materials. In some embodiments herein, by design, thermal properties are tailored to the desired application and sensitivity. Rather than achieving desired thermal resistance through geometry and material selection, the embodiments herein utilize intentionally introduced phonon scattering structures to tailor thermal resistance in thermal sensors.

Some embodiments herein provide structures and methods by which the thermal resistance of the interconnects, supports, and/or "legs" of thermal sensors will be increased through better control tailoring of heat flow, by intentionally introducing phonon scattering sites, while not significantly inhibiting electrical flow. Moreover, this will be accomplished without requiring excessive thinning or lengthening of structures (as is currently done). This will enable faster, more sensitive, higher resolution thermal sensing compared with the existing state of the art and the fabrication of devices with higher operability.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a schematic diagram illustrating a prior art temperature sensing device;

FIGS. 1B and 1C are schematic diagrams illustrating a temperature sensing device in accordance with an example embodiment disclosed herein;

DETAILED DESCRIPTION

Figure 1D:
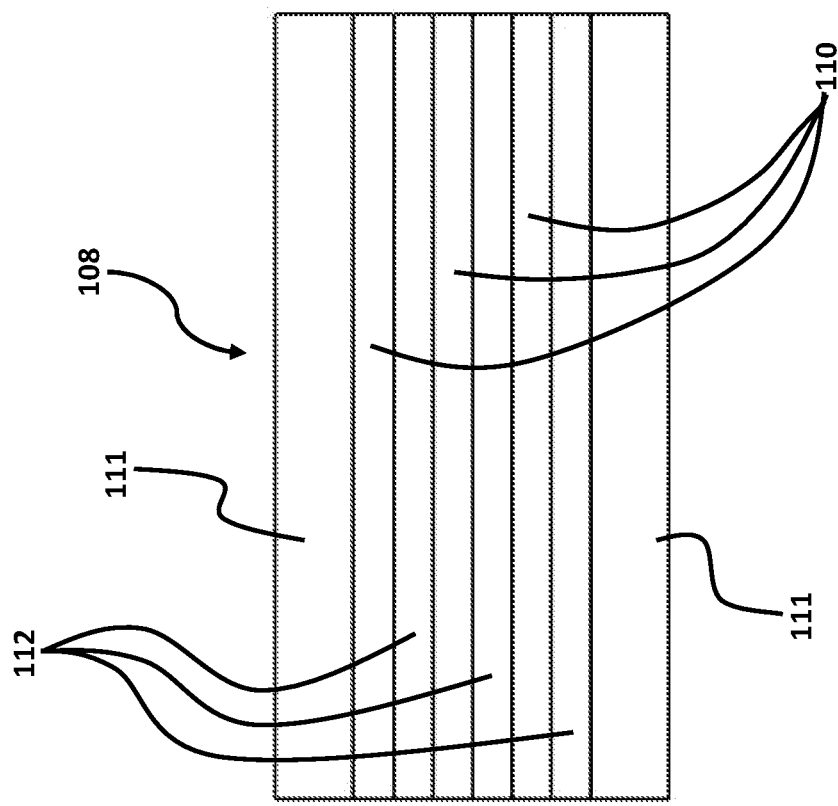
FIG. 1D is a schematic diagram illustrating a nanolaminate structure for increasing thermal resistance while maintaining acceptable electrical conductivity in a conductive path of an electronic device in accordance with some of the embodiments disclosed herein.
Figure 1C:
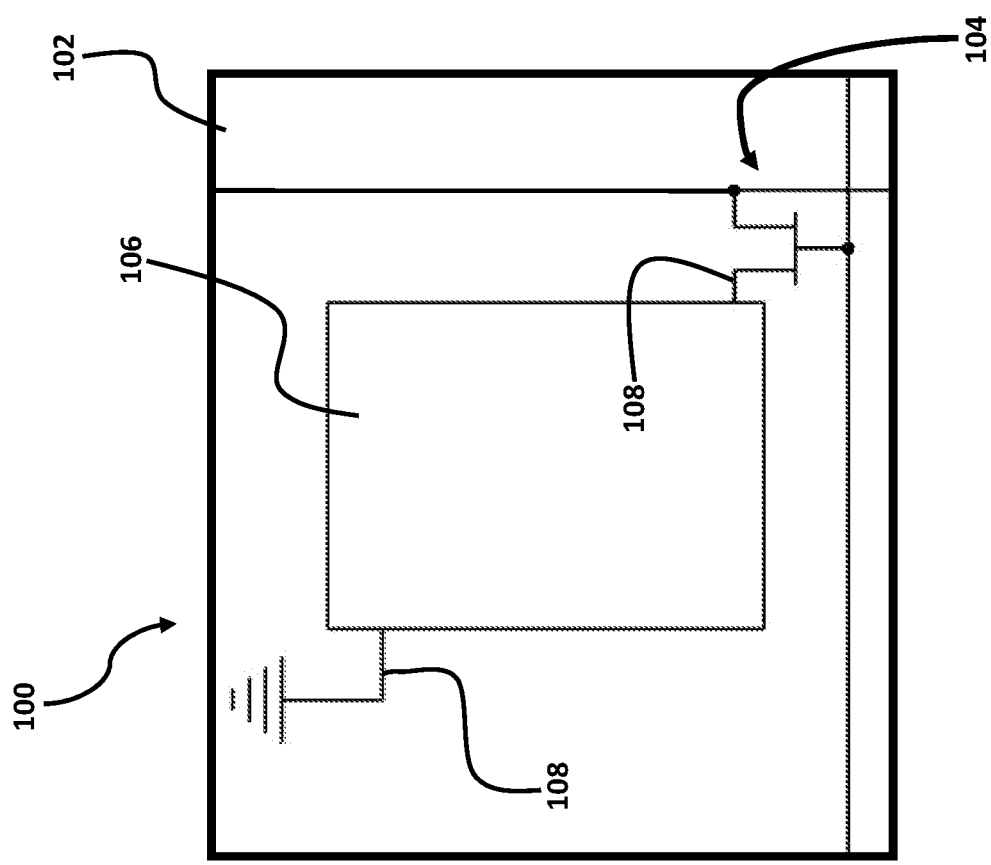

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring to FIGS. 1A-1D and 5-9, some embodiments disclosed herein are directed to a thermal sensor device 100, which includes a substrate 102, read-out circuitry 104, a thermal sensor element 106, and at least one conductive path 108. The substrate 102 may, for example, be made of silicon. The substrate 102 may, for example, be a silicon die cut from a silicon wafer. It is contemplated that the substrate may also be made of other semiconductors including compound semiconductors. Usually, arrays of thermal sensor devices 100 and thermal sensor elements 106 are provided on the substrate 102. In the illustrated example, the thermal sensor devices 100 is a microbolometer. The read-out circuitry 104 may be integrated into the substrate 104, or it may be provided on a separate die. The substrate 102 having the array of devices 100 thereon may be vacuum packaged to prevent convective heat losses.

The read-out circuitry 104 may include at least some integrated circuit (IC) elements that may include row and column interconnects, complementary metal-oxide-semiconductor (CMOS) field-effect transistors, metal-oxide-semiconductor field-effect transistors (MOSFETs), multiplexers, integrators, capacitors, and bipolar junction transistors to name a few. The above list of circuit elements is by no means intended to exhaustive or limiting and is only intended for providing examples of circuit element that may be included in the read-out circuitry 104. The read-out circuitry 104 may include any number of other circuit elements. The read-out circuitry 104 used with arrays of microbolometers is well-known and will not be discussed here in detail. In the illustrated example, a MOSFET, a ground connection, and some wiring are shown as a diagrammatic representation of the read-out circuitry 104.

The thermal sensor element 106 is supported or suspended over the substrate 102 at a height (approximately 2 µm in some examples) above the substrate 102 by at least one electrically conductive leg that constitutes the at least one conductive path 108 in some embodiments. In the illustrated embodiment, there are two support legs that form two conductive paths 108. Accordingly, the conductive paths 108 function both to suspend the thermal sensor element 106 above the substrate 102 and to provide for electrical communication between the thermal sensor element 106 and the read-out circuitry 104. The conductive paths 108 are of enhanced thermal resistance and extend between the thermal sensor element 106 and the read-out circuitry 104. Accordingly, the conductive paths 108 are configured for conducting electrical signals between the thermal sensor element 106 and the read-out circuitry 104, while providing enhanced thermal resistance that increases the sensitivity of the thermal sensor device 100 to thermal radiation 109.

Each of the conductive paths 108 of enhanced thermal resistance comprises a first material and at least one phonon transport disrupting structure, also referred to herein as a phonon scattering structure or site. The phonon transport disrupting structure is configured to increase the thermal resistance of each conductive path 108 of enhanced thermal resistance as compared to a similar conductive path that lacks the phonon transport disrupting structure. The similar conductive path would be made of the first material, would be configured for conducting an electrical signal between the thermal sensor element 106 and the read-out circuitry 104, and would be identical in geometry to the corresponding conductive path 108 of enhanced thermal resistance.

In some embodiments herein, the conductive paths 108 may solely serve the function of providing for electrical communication between the thermal sensor element 106 and the read-out circuitry 104, while the structural support for suspending the thermal sensor element 106 over the substrate 102 may be provided by thermally insulating legs. The conductive paths 108 may be formed on the thermally insulating legs, or the conductive paths 108 may be located adjacent to or apart from the thermally insulating legs. Even in embodiments where the conductive paths 108 solely serve the function of providing for electrical communication between the thermal sensor element 106 and the read-out circuitry 104, increasing the thermal resistance of the conductive paths 108 will enhance the sensitivity of the thermal sensor device 100 by reducing the rate of conductive heat loss from the thermal sensor element 106.

The read-out circuitry 104 allows the value of the temperature-dependent electrical characteristic of the thermal sensor element 106 (e.g., voltage, resistance, etc.), which is indicative of the current temperature of the thermal sensor element 106, to be read out to image processing circuitry that produces an image array of pixels. The value of each image pixel would code for the temperature detected by the thermal sensor element 106 of the corresponding thermal sensor device 100. A thermal image can be obtained from the array of thermal sensor devices 100 in this way. The image processing circuitry, also referred to as back-end electronics, is well-known and will not be discussed here in detail. The thermal sensor device 100 may also be used as a sensor for a non-contact digital thermometer.

The most commonly used materials for the thermal sensor element 106 are amorphous silicon and vanadium oxide ($VO_x$). Vanadium oxide occurs as a mixture of a plurality of different oxides of vanadium. For thermal sensor applications, x is commonly about 1.8. These materials are provided by way of example and should not be construed as limitations on the appended claims. There are many other materials that have been used for thermal sensor applications and all are considered to be within the scope of the embodiments herein. The example materials have resistances that vary with temperature with a temperature coefficient of resistance (TCR) that is suitable for thermal sensor applications.

The conduction of the electrical signal through each conductive path 108 of enhanced thermal resistance is at least in part due to the transport of conduction electrons through the conductive path 108 of enhanced thermal resistance. The conduction electrons of the conductive path 108 of enhanced thermal resistance have a mean free path that has a size scale. The phonon transport disrupting structure is on a size scale that is larger than the size scale of the mean free path of the conduction electrons in the conductive path 108 of enhanced thermal resistance so as to reduce any deleterious effect of the phonon transport disrupting structure on the conduction of the electrical signal through the conductive path 108 of enhanced thermal resistance.

The heat transfer through the conductive path 108 is at least in part due to the transport of phonons through the conductive path 108. The phonons of the conductive path 108 have a mean free path that has a size scale. The phonon transport disrupting structure is on the size scale of the mean free path of the phonons in the conductive path 108 so as to increase scattering and transport disruption of the phonons through the conductive path 108 and thus enhance the thermal resistance of the conductive path 108.

In some embodiments herein, the conductive path 108 that has enhanced thermal resistance includes a plurality of phonon transport disrupting structures configured to increase the thermal resistance of the conductive path 108 as compared to a similar conductive path that lacks the phonon transport disrupting structures.

In some embodiments herein, the phonon transport disrupting structures comprise structural features selected from the group consisting of:
(a) dissimilar material interfaces formed by a stack of alternating layers 110 and 112 of the first material and a second material, respectively, wherein the thickness of each of the layers is selected so as to cause scattering of phonons while not significantly inhibiting the transport of conduction electrons through the conductive path 108 of enhanced thermal resistance;
(b) defects 114 within the first material 115 that are tailored to cause scattering of phonons while not significantly inhibiting the transport of conduction electrons through the conductive path 108 of enhanced thermal resistance;
(c) nanocrystalline grains 116 having sharp grain boundaries 118 of an average grain size selected so as to promote diffusive scattering and/or reflections of phonons at the grain boundaries while not significantly inhibiting the transport of conduction electrons through the conductive path 108 of enhanced thermal resistance;
(d) dopants 120 incorporated into the first material 115 and selected so as to cause scattering of phonons while not significantly inhibiting the transport of conduction electrons through the conductive path 108 of enhanced thermal resistance;
(e) conductive polymers 122 used as the first material 115a or in conjunction with the first material in the conductive path 108 of enhanced thermal resistance and configured to cause scattering of phonons while not significantly inhibiting the transport of conduction electrons through the conductive path 108 of enhanced thermal resistance;
(f) doped polymers 124 used as the first material 115b or in conjunction with the first material in the conductive path 108 of enhanced thermal resistance and configured to cause scattering of phonons while not significantly inhibiting the transport of conduction electrons through the conductive path 108 of enhanced thermal resistance; and
(g) any combination of the structural features (a) through (f).

In some embodiments herein, the phonon transport disrupting structures comprise dissimilar material interfaces formed by a stack of alternating layers 110 and 112 of the first material and a second material, respectively. The thickness of each of the layers 110 and 112 is selected so as to cause scattering of phonons while not significantly inhibiting the transport of conduction electrons through the conductive path 108 of enhanced thermal resistance. In some embodiments herein, the conductive path 108 is covered by one or more cladding layers 111.

In some embodiments herein, the phonon transport disrupting structures comprise dissimilar material interfaces formed by a nanolaminate stack of alternating layers of the first material and the second material, wherein the first material is aluminum, and the second material is silicon dioxide. In some embodiments herein, the phonon transport disrupting structures comprise dissimilar material interfaces formed by a nanolaminate stack of alternating layers of the first material and the second material, wherein the first material is tungsten, and the second material is formed from one or more oxides of vanadium. The thickness of each of the layers 110 and 112 is in the range of from about 5 nm to about 50 nm.

Referring to FIGS. 11-19, some embodiments herein are directed to the use of phonon disruption strategies to intentionally reduce thermal conductance in thermal sensors while maintaining electrical conductance to allow signal read-out. Some embodiments herein are directed to methods such as, for example, the method (200) for forming a conductive path 108 of enhanced thermal resistance in an electronic device. The method (200) includes providing (202) a conductive path 108 comprising a first material as part of the electronic device. The method (200) also includes forming (204), as part of the conductive path 108, one or more phonon transport disrupting structures configured to increase the thermal resistance of the conductive path 108 in order to provide a conductive path 108 having enhanced thermal resistance. The conductive path 108 has enhanced thermal resistance compared to a similar conductive path that would be made of the first material, that would be configured for conducting electrical signals between the thermal sensor element 106 and the read-out circuitry 104, that would be identical in geometry to the conductive path 108 of enhanced thermal resistance but would lack the phonon transport disrupting structures of the conductive path 108 of enhanced thermal resistance.

In some embodiments herein, forming (204) the phonon transport disrupting structures comprises forming (206) a stack of alternating layers of the first material and a second material, wherein the thickness of each of the layers is selected so as to cause scattering of phonons while not significantly inhibiting the transport of conduction electrons through the conductive path 108 of enhanced thermal resistance.

In some embodiments herein, forming (204) the phonon transport disrupting structures comprises forming (208) a nanolaminate stack of alternating layers of the first material and the second material, wherein the first material is aluminum, and the second material is silicon dioxide.

In some embodiments herein, forming (204) the phonon transport disrupting structures comprises forming (210) a nanolaminate stack of alternating layers of the first material and the second material, wherein the first material is tungsten, and the second material is formed from one or more oxides of vanadium.

In some embodiments herein, forming (204) the phonon transport disrupting structures comprises introducing (212) defects into the first material that are tailored to cause scattering of phonons while not significantly inhibiting the transport of conduction electrons through the conductive path 108 of enhanced thermal resistance.

In some embodiments herein, forming (204) the phonon transport disrupting structures comprises providing (214) for the first material to include nanocrystalline grains having sharp grain boundaries of an average grain size selected so as to promote diffusive scattering and/or reflections of phonons at the grain boundaries while not significantly inhibiting the transport of conduction electrons through the conductive path 108 of enhanced thermal resistance.

In some embodiments herein, forming (204) the phonon transport disrupting structures comprises introducing (216) dopants into the first material, wherein the dopants are of the same type or of a variety of types, and wherein the type or types of dopant are selected so as to cause scattering of phonons while not significantly inhibiting the transport of conduction electrons through the conductive path 108 of enhanced thermal resistance.

In some embodiments herein, forming (204) the phonon transport disrupting structures comprises forming (218) the conductive path 108 of enhanced thermal resistance at least in part from a conductive or doped polymer, and wherein the conductive or doped polymer is configured to cause scattering of phonons while not significantly inhibiting the transport of conduction electrons through the conductive path 108 of enhanced thermal resistance.

In some embodiments herein, the conductive path 108 of enhanced thermal resistance comprises at least one material selected from the group consisting of:
(a) material having nanocrystalline grains having sharp grain boundaries of an average grain size selected so as to promote scattering of phonons at the grain boundaries while not significantly inhibiting the transport of conduction electrons through the conductive path of enhanced thermal resistance;
(b) conductive polymers configured to cause scattering of phonons while not significantly inhibiting the transport of conduction electrons through the conductive path of enhanced thermal resistance;
(c) doped polymers configured to cause scattering of phonons while not significantly inhibiting the transport of conduction electrons through the conductive path of enhanced thermal resistance;
(d) materials exhibiting surface mode electrical conduction; and
(e) any combination of the materials (a) through (d).

Figure 10:
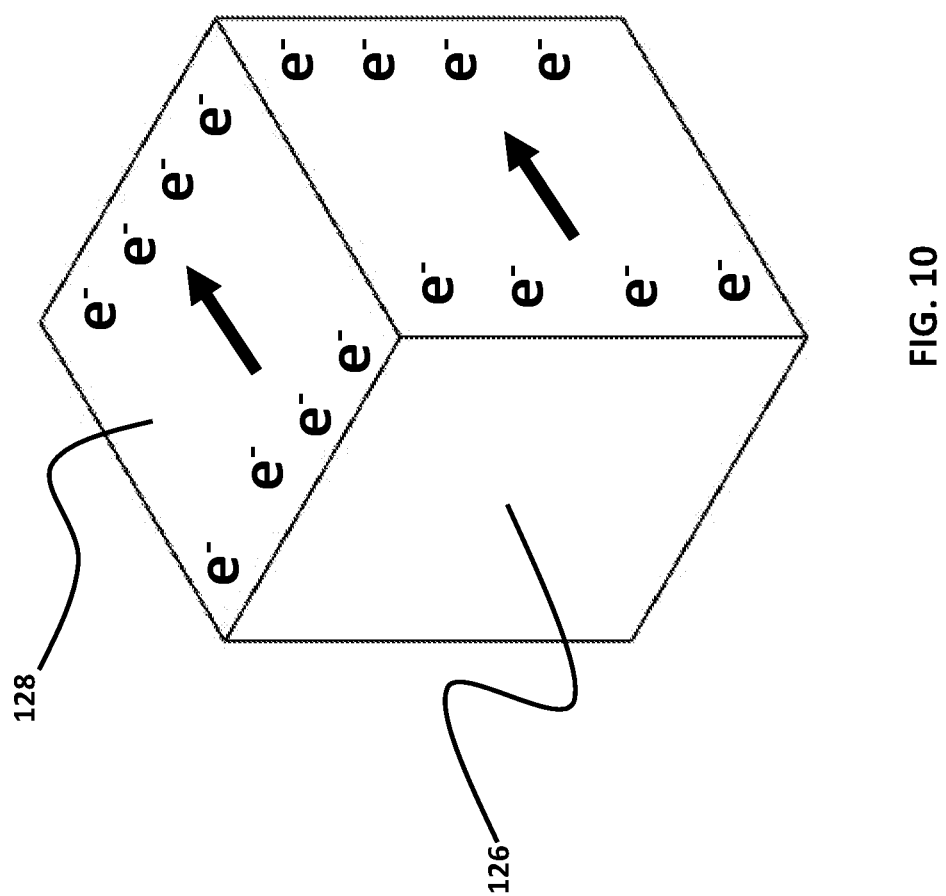
FIG. 10 is a fragmentary diagram illustrating a conductive path that employs material exhibiting surface mode electrical conduction in accordance with some of the embodiments herein.
Figure 11:
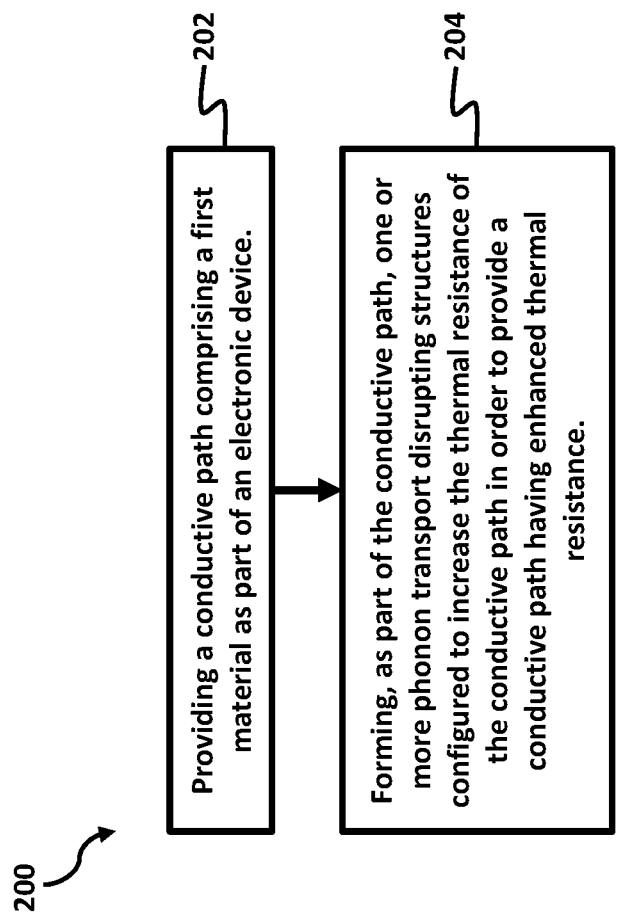
FIG. 11 is a flow diagram illustrating a process for producing an electronic device having an electrically conductive path of enhanced thermal resistance by employing phonon transport disrupting structures in accordance with some of the embodiments disclosed herein.
Figures 12, 13:
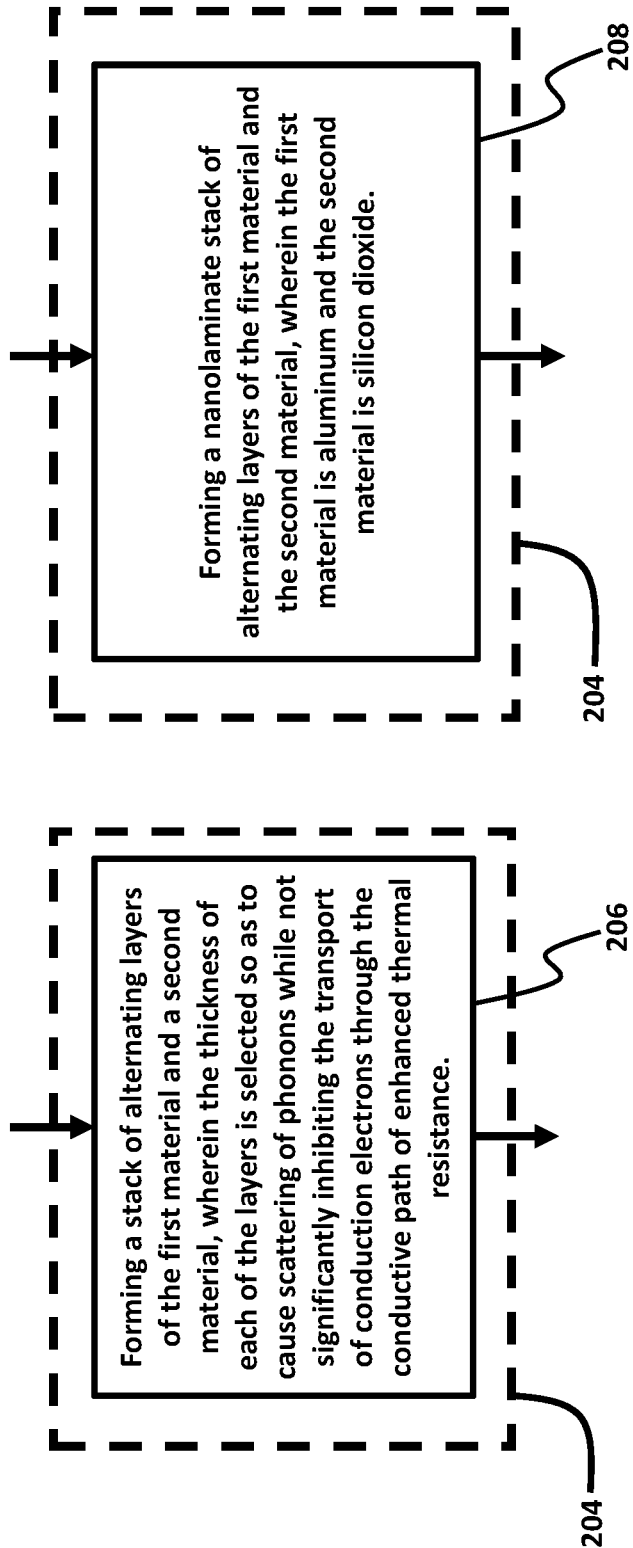
FIGS. 12-19 are a flow diagrams illustrating alternative processes for forming phonon transport disrupting structures in an electrically conductive path in accordance with some of the embodiments disclosed herein.
Figures 14, 15:
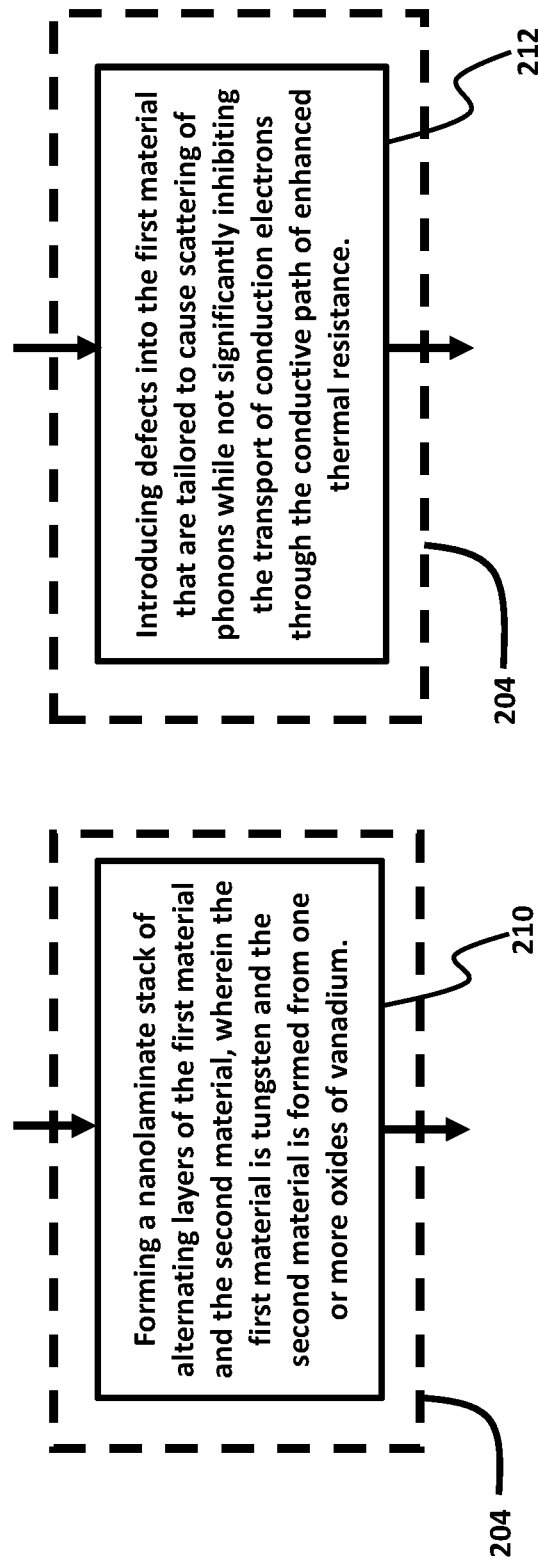
Figures 16, 17:
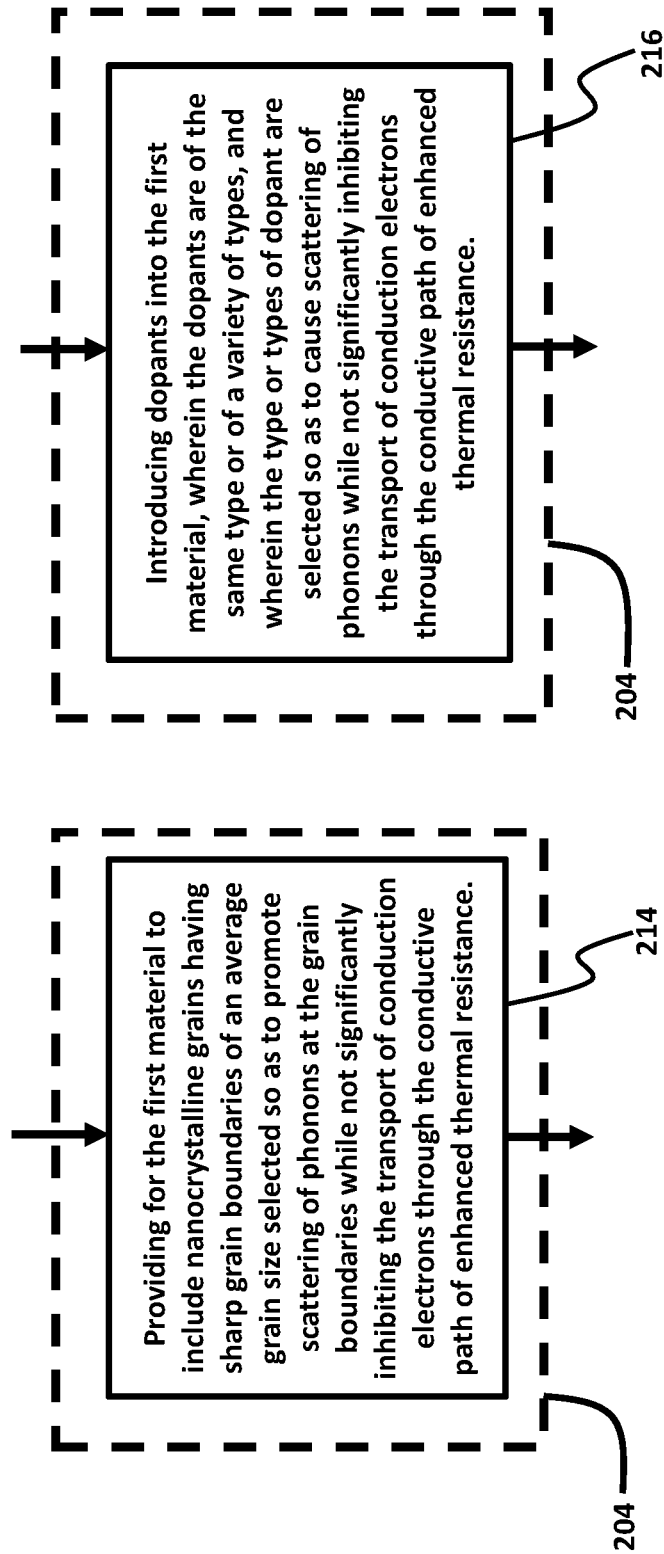
Figure 19:
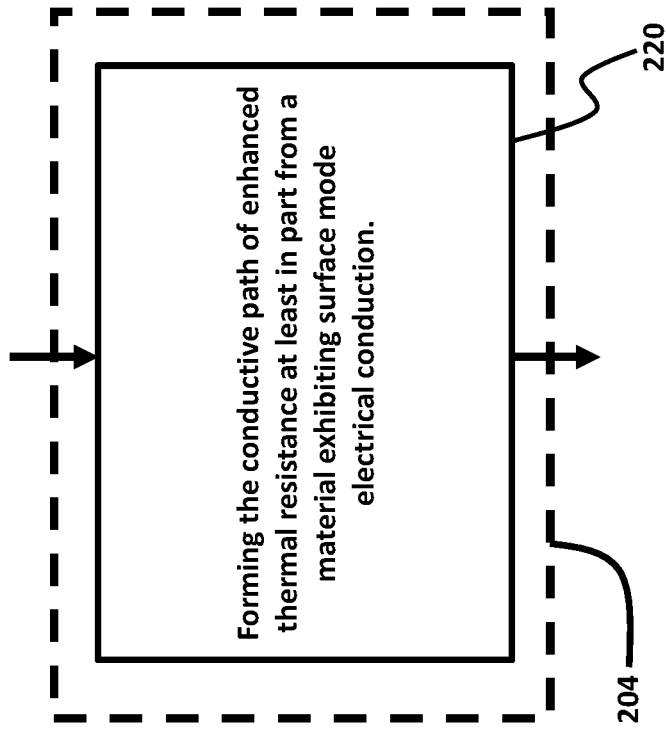
Figure 18:
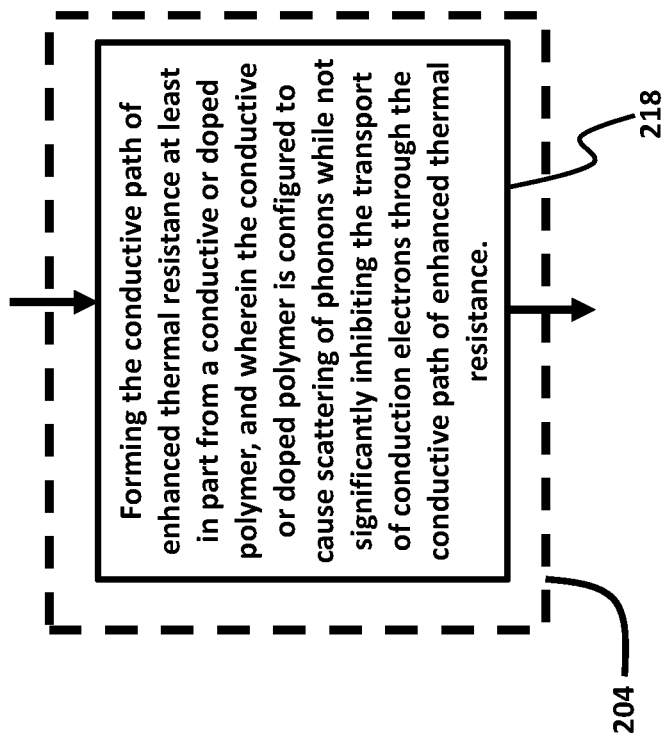

Referring to FIGS. 10 and 19, in some embodiments herein, forming (204) the phonon transport disrupting structures comprises forming (220) the conductive path 108 of enhanced thermal resistance at least in part from a material exhibiting surface mode electrical conduction. Such material is thermally and electrically insulating in its bulk 126, but its surface states permit conduction of electrons along the surface 128 of the material.

Defect Scattering and Doping

In embodiments where forming the phonon transport disrupting structures comprises introducing defects/dopants into the first material that are tailored to cause the phonon transport to decrease with respect to the electron transport (in the case of defects, this is achieved by increasing phonon scattering, while in the case of dopants, this is achieved by increasing electrical conductivity), defects and dopants can be introduced in the material using, for example, ion-implantation, thermal diffusion, and introduction of trace elements in the melt/vapor deposition source. For the introduction of defects, ion implantation may be used with ions of inert gases or ions of the element making up the first material as well as implantation of a dopant.

Regardless of method selected, range of dopant/defect concentration should be carefully selected to increase thermal resistance relative to electrical resistance without drastically increasing the latter. Typical defect concentration that maximize phonon disruption while maintaining electrical conductivity range from $10^{15}$-$10^{21}$ cm$^{-3}$, while dopant concentration ranges from $10^{18}$-$10^{21}$ cm$^{-3}$.

Examples include: $Bi_2Te_3$ doped with charge-carrying elements such as S, Fe, Sb, Li, H$^+$, etc.; crystalline materials with intentional defects meant to disrupt the majority heat-carrying vibrational modes (e.g., doped Si with defects on the order of $10^{15}$-$10^{18}$ cm$^{-3}$). In crystalline materials which typically may exhibit advantageous electrical properties, phonon mean free path values range from <1 nm-1 µm, while typically electron mean free path values range from 10 nm to 100 nm. This varies greatly from material to material; however, with judicious material selection, using known phonon and electron mean free path data, suitable material, that has suitable electrical conductivity while exhibiting an advantageous or sufficient difference between the mean free paths of phonons and electrons, can be identified.

It should be noted that while an increase in electrical conductivity corresponds to an increase in the electronic contribution to the overall thermal conductivity, the introduction of dopants may also simultaneously decrease phonon transport by increasing electron-phonon scattering probability (since the dopants increase the free electron population in the material), as well as by increasing phonon-phonon scattering (by the presence of the dopant atom in the crystal lattice, which acts as a vibrational scattering site). Accordingly, there is an overall decrease in thermal conductivity despite the increase in electrical conductivity resulting from the introduction of dopants.

Grain Boundary Scattering

In embodiments where forming the phonon transport disrupting structures comprises providing for the first material to include nanocrystalline grains having sharp grain boundaries of an average grain size selected so as to promote diffusive scattering and/or reflections of phonons at the grain boundaries while not significantly inhibiting the transport of conduction electrons through the conductive path 108 of enhanced thermal resistance, material fabrication conditions (thin film deposition—e.g., sputtering, thermal evaporation, physical or chemical vapor deposition with controlled environments with appropriate chamber pressures and ambient temperatures) or ex-situ anneal with the appropriate pressure and temperature conditions according to phase diagrams to selectively promote grain boundaries with favorable properties to promote phonon scattering.

For example, selective growth of NiTi alloys; according to the phase diagram of Nickel and Titanium, NiTi grains will grow in the range of temperature 900K to 1600K. Grains grown in this way and rapidly quenched are known to have coherent grain boundaries, which promote phonon scattering at the interface.

The smaller the grain size, the more likely scattering is to occur, since grain boundary density increases with smaller grains. Grain sizes can readily be achieved from the 10's nm to 10's μm scale or larger depending on the post-fabrication heat treatment of the material.

In crystalline materials which typically may exhibit advantageous electrical properties, phonon mean free path values range from <1 nm-1 μm, while typically electron mean free path values range from 10 nm to 100 nm. This varies greatly from material to material; however, with judicious material selection, using known phonon and electron mean free path data, suitable material, that has suitable electrical conductivity while exhibiting an advantageous or sufficient difference between the mean free paths of phonons and electrons, can be identified.

Conductive Polymers

As previously stated, the phonon transport disrupting structures may be formed by processes comprising forming the conductive path 108 of enhanced thermal resistance at least in part from a conductive or doped polymer in some embodiments herein. The conductive or doped polymer is configured to cause scattering of phonons while not significantly inhibiting the transport of conduction electrons through the conductive path 108 of enhanced thermal resistance.

The polymer may be treated or doped such that its electrical conductivity achieves an orders of magnitude enhancement over its bulk properties, while thermal resistance is not substantially decreased.

Dopant concentration by weight % in the range of 5-25% achieves $10$-$10^4$ fold increase in electrical conductivity while only observing 2 to 10 fold increase in thermal conductivity.

Examples of suitable conductive/doped polymers include, without limitation, polyaniline doped with camphorsulfonic acid (PANI-CSA), poly-(methyl-methacrylate) polymer (PMMA), polyimide (PI), poly(3,4-ethylenedioxythiophene) polystyrene sulfonate (PEDOT:PSS), doped with: Iron, Copper, Gold, Silver, or Carbon Nanotubes.

Polymers in bulk form are the compilation of many long, meandering chains. Because they are disordered, coherent phonon propagation is quickly dissipated into diffusive thermal energy, and this leads to significant inhibition of heat transfer across these materials. By incorporating electrically conductive dopants, thermal conductivity associated with electron transport will increase, but the same phonon scattering sites will continue to exist, which leads to advantageous properties for this application.

When electrically conducting dopants are infiltrated into the polymeric sample, their locally stronger electrical potential tends to cause the dopants to spontaneously form electrically connected chains, which allows for many orders of magnitude increase in electrical conductivity, owing to a connected whereby electrons are not readily scattered, while phonons are still scattered as they usually are given the long-range disorder of small molecular chains (each with size on the order of 1-10 nm).

Surface Mode Electrical Conduction

In some embodiments herein, forming the phonon transport disrupting structures comprises forming the conductive path of electrons only along the surface of the material, while in the bulk, the material is configured to cause scattering of both phonons and electrons, inhibiting the transport of both electrons and phonons through the bulk, but maintaining a conductive path for electrons at the surface.

The surface mode is protected from the influence of phonons, and only carries heat by way of electron transfer. This is achieved by creating a material with electron band structures such that electrons may travel and/or carry their spin orientation (with little to no loss) in a surface state, but not in bulk states.

Materials exhibiting topological insulator properties: CdTe/HgTe/CdTe quantum wells, bi-layer Bi, $Bi_{1.1}Sb_{0.9}Te_2S$, $SmB_6$; other materials with the right dopant concentrations, bandgap energies, crystalline quality, etc. may also be made.

In topologically-protected surface states, the electrons travel with much less loss than in their bulk counter-part, often approaching super-conducting behavior (where zero loss is observed). In most cases, electron spin is coherently preserved without loss, and this leads to the potential to convert thermally generated electrical signal into surface-mode electrons which can then carry the information they generate to a spin-gate which reads the information in lieu of (or in addition to) the present read-out circuitry.

These materials typically are insulating in bulk while conductive in the surface state, and the same holds true for thermal properties; thermal conductivity of these systems is typically quite small due to the multi-element/multi-layer nature. The structure of the multilayer systems here are smaller (<1 nm to 30 nm) than the mean free paths of phonons in the individual, or elemental layers (where they would be 10 nm-1 μm).

Testing and Analysis

Initial testing has successfully demonstrated increased thermal resistance by adding interface density to nanolaminate structures. In actual testing, an ~2.5× increase in thermal resistance has been demonstrated for a material stack of Si and Al. A modeled performance showing an increase in thermal resistance as high as ~7.5× has been obtained for Si and Al, and over 22× has been obtained for conductive $VO_2$ and W.

The testing and analysis presented below is a summary of the experimental results, analysis, and experimental procedures presented in the journal article "Interface Density Effects on Cross-Plane Thermal Conductance of Nanolaminate Thin Films," by Adam A. Wilson et al., Proceedings of the Intersociety Conference on Thermal and Thermomechanical Phenomena in Electronic Systems, IEEE ITHERM, May 26-29, 2020, Lake Buena Vista, FL, USA, which is incorporated herein by reference in its entirety. Details of the testing and experimental procedures used can be found in that journal article.

FIG. 1A depicts a prior art microbolometer 101, which is characterized by long, meandering leg structures 108a. FIG. 1B depicts a microbolometer 100 in accordance with some of the embodiments disclosed herein, which allows shorter and thicker interconnects and higher sensitivity operation by leveraging manipulation of the phonon behavior of the interconnect structure and/or material.

Uncooled microbolometers rely on thermal isolation and electrical continuity between the thermal sensor element and the read-out circuitry. In the current state-of-the-art designs, thermal isolation is achieved by long, meandering leg structures 108a, which lengthens the conduction path to increase thermal resistance. If thermal resistance along the path of electrical continuity could be significantly increased (without suffering deleterious effects on electrical properties), measured signal could be significantly enhanced, and the legs could be shortened, or altogether abandoned, leading to much-improved resolution, higher pixel density, and increased stiffness which avoids pixel sagging and unintended thermal shorting. The embodiments herein provide for significant increases in thermal resistance by disrupting phonon-mediated heat conduction in these systems, while maintaining electrical continuity.

Phonon-mediated heat conduction relies on vibrations of atoms in a crystal lattice. The diffuse mismatch model (DMM) may be used to predict thermal resistance arising due to phonon scattering at interfaces. The Landauer formalism is commonly used and widely accepted as the standard for predicting interface conductance, $G_{int}$, which may be expressed as:

$$G_{int} = \frac{1}{4} \sum_j \int_0^{\omega_{A,j}^v} D_{A,j}(\omega) \frac{\partial n(\omega, T)}{\partial T} \hbar \omega v_{A,j} \alpha_{A \to B,j}(\omega) d\omega \quad (1)$$

where D (ω) is the phonon density of states, $\omega^v$ is the cut-off frequency, $v_j$ is the phonon group velocity of polarization j, and $\alpha_{A \to B}$ is the phonon transmission coefficient between layers A and B.

DMM is based on the more general Landauer formalism, and assumes that phonons are diffusively scattered at the interface, thereby losing all memory of the material they came from. Under this assumption, $\alpha_{A \to B}$ is defined as:

$$\alpha_{A \to B, DMM} = \frac{\Sigma_j D_{B,j} v_{B,j}}{\Sigma_j D_{A,j} v_{A,j} + \Sigma_j D_{B,j} v_{B,j}} \quad (2)$$

Figure 2:
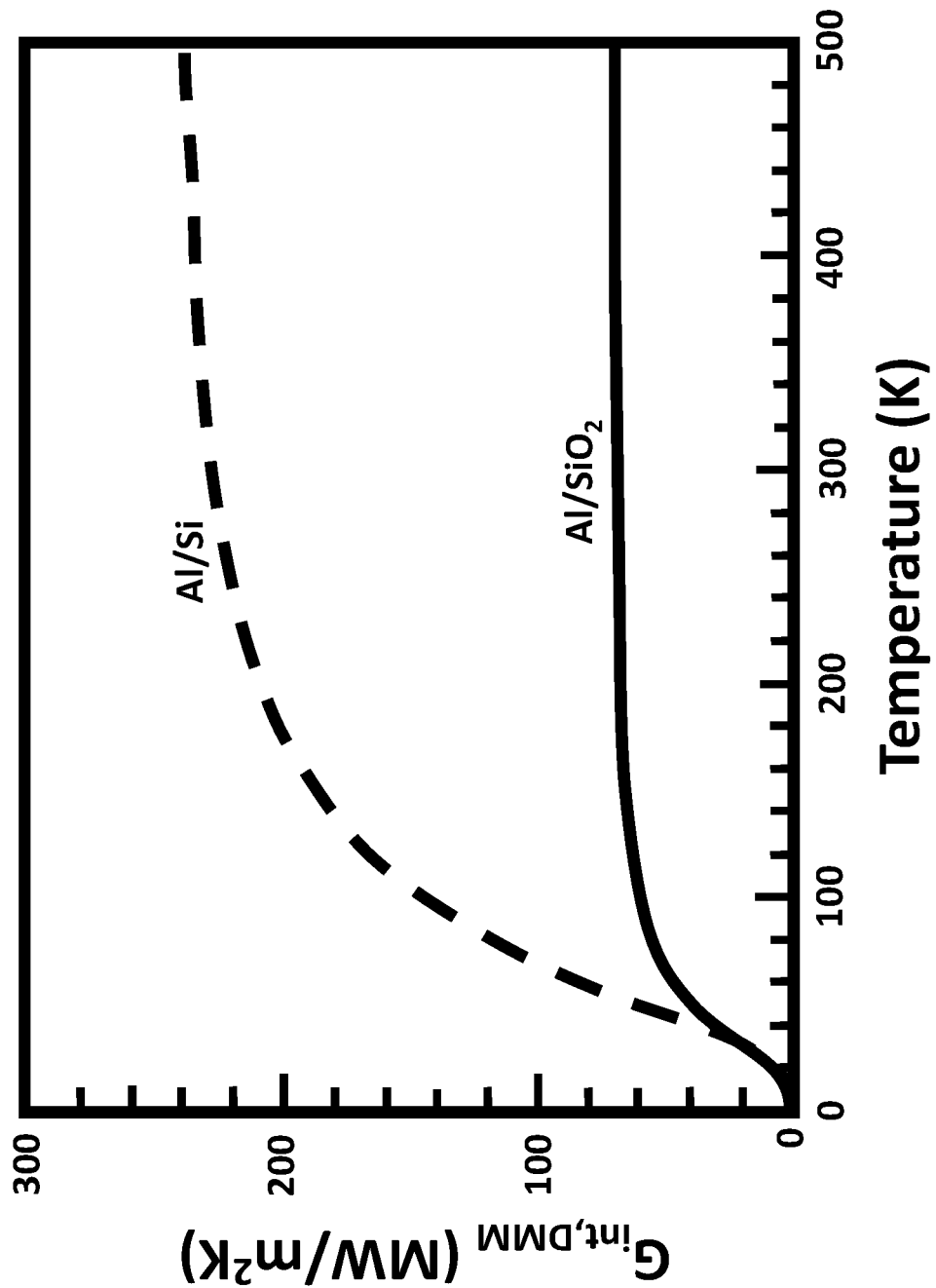
FIG. 2 is a graph showing the diffuse mismatch model predictions for interface thermal conductance between Al and Si (dashed line) and between Al and $SiO_2$, which examples of materials for use with some of the embodiments disclosed herein.

Silicon dioxide and aluminum were chosen as the test materials. This is because the phonon dispersion relations are well established for these materials, and thereby DMM may be used to predict the effect of interface density. Also, DMM predicts a relatively low value of $G_{int}$ (69.1 MW/m²K at room temperature, compared with Al/Si's room temperature value of 228 MW/m²K) due to the dissimilarity in the phonon density of states and speed of sound in the materials. FIG. 2 depicts the predicted DMM response of a single interface of Al on Si and Al on $SiO_2$ as a function of temperature. FIG. 2 shows the diffuse mismatch model predictions for interface thermal conductance between Al and Si (dashed line) and between Al and $SiO_2$ (solid line).

Figure 3A:
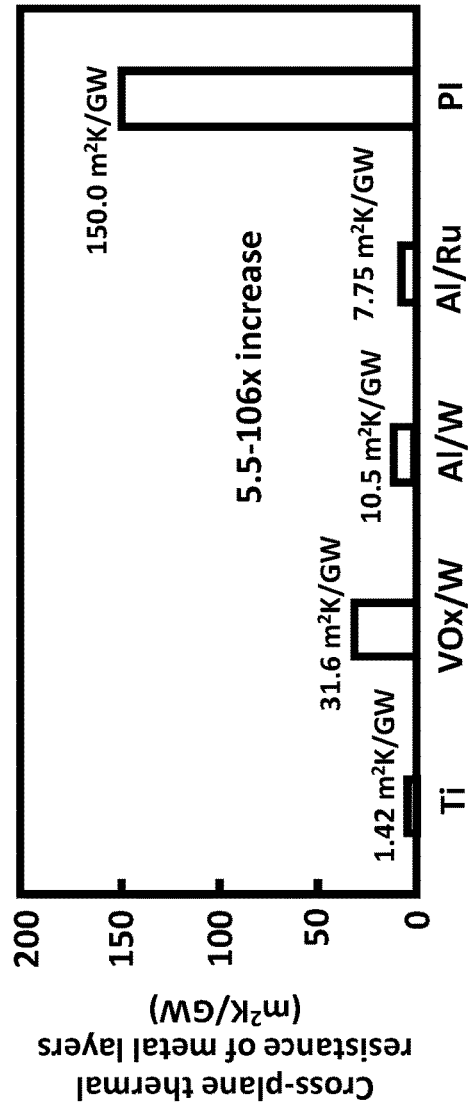
FIG. 3A is a graph illustrating the cross-plane thermal resistance for different materials and material combinations that include metal layers.
Figure 3B:
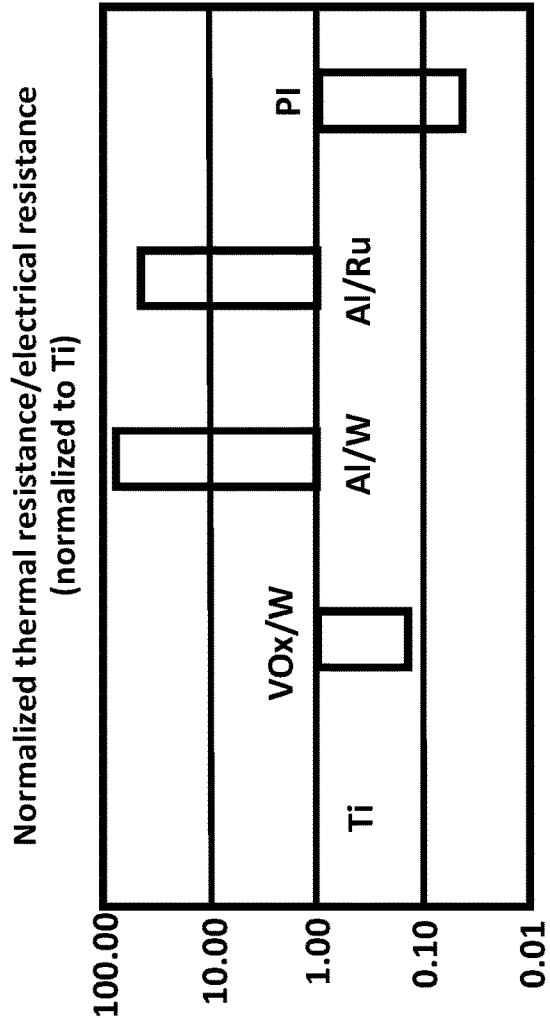
FIG. 3B is a graph illustrating the ratio of thermal resistance to electrical resistance, normalized to Ti, for each of the materials and material combinations in FIG. 3A.

FIG. 3A depicts the effect of increased interface density on the per-unit area cross-plane thermal resistance, showing that thermal resistance may be significantly increased by selection of material and by increasing interface density. FIG. 3B depicts the ratio of thermal resistance to electrical resistance, normalized to Ti. Clearly this represents a substantial advantage over currently used strategies, because in a device, thermal resistance scales linearly with leg length, while stiffness goes as the length cubed (i.e., if we increase thermal resistance by a factor of 2, we can make the device stiffer by a factor of 8). This provides a strategy for performance enhancements in multiple domains at once.

With a near-room temperature value for interface thermal conductance established, the effect on the multilayer stack is projected. Assuming that diffusive scattering occurs at every interface, each interface will introduce the resistance imparted by that interface $$\left(\text{i.e., } R_{int} = \frac{1}{G_{int}}\right).$$

If no interface is present, the effective thermal conductivity ($k_{eff}$) of a single film having the combined properties of each Al and $SiO_2$ thin films assuming one-dimensional heat transport in the cross-plane direction is calculated as:

$$k_{eff, nointerface} = \frac{t_{total}}{t_{Al}/k_{Al} + t_{SiO_2}/k_{SiO_2}} \quad (3)$$

where t is the film thickness, and k is thermal conductivity of each Al and $SiO_2$. Note that this assumes cross-sectional area remains constant between each layer.

$R_{int}$ is added to account for the effect of the interface on the effective value of thermal conductivity for the thin film:

$$k_{eff} = \frac{t_{total}}{\frac{t_{Al}}{k_{Al}} + \frac{t_{SiO_2}}{k_{SiO_2}} + nR_{int}} \quad (4)$$

where n is the number of interfaces within the film stack. This allows the calculation of the effective thermal conductivity for both the case where there is no loss at any interface, and where the phonons are diffusively scattered at each interface, as predicted by DMM. Next, the DMM predictions can be compared with experimental results.

To experimentally determine the effective thermal conductivity of multilayer stacks, nanolaminate thin films of Al and $SiO_2$ were prepared by electron beam evaporation in an Evatec BAK 641. Nominal film thickness was held constant at 500 nm for each film stack. All films were deposited on double-side polished silicon (100) wafers. After deposition, a stylus profiler was used to measure film thickness by edge height ($t_{total}$), which revealed an error in aluminum tooling factor during evaporation (412 nm was deposited during a nominal 500 nm run), which was corrected during subsequent depositions. Table 1 summarizes the thin film on substrate samples prepared for testing the effect of interface density on thermal resistance. The table includes film thickness $t_{total}$, the number of Al/SiO$_2$ interfaces in the stack (zero for single film-on-substrate) $n_{Al/SiO_2}$, and interface density (number of Al/SiO$_2$ interfaces per µm of film thickness)

$$\frac{n_{Al/SiO_2}}{t_{total}(\mu m)}.$$

TABLE 1

Films to be analyzed

| Nominal Film Stack (in nm if specified) | $t_{total}$ (nm) | $n_{Al/SiO_2}$ | $\frac{n_{Al/SiO_2}}{t_{total}}$ (µm) |
|---|---|---|---|
| 500-SiO$_2$/Si | 502 | 0 | 0 |
| 500-Al/Si | 412 | 0 | 0 |
| 250-Al/250-SiO$_2$/Si | 491 | 1 | 2.04 |
| 10 × (25-Al/25-SiO$_2$)/Si | 497 | 19 | 38.23 |
| 25 × (10-Al/10-SiO$_2$)/Si | 498 | 49 | 98.39 |

Figure 4:
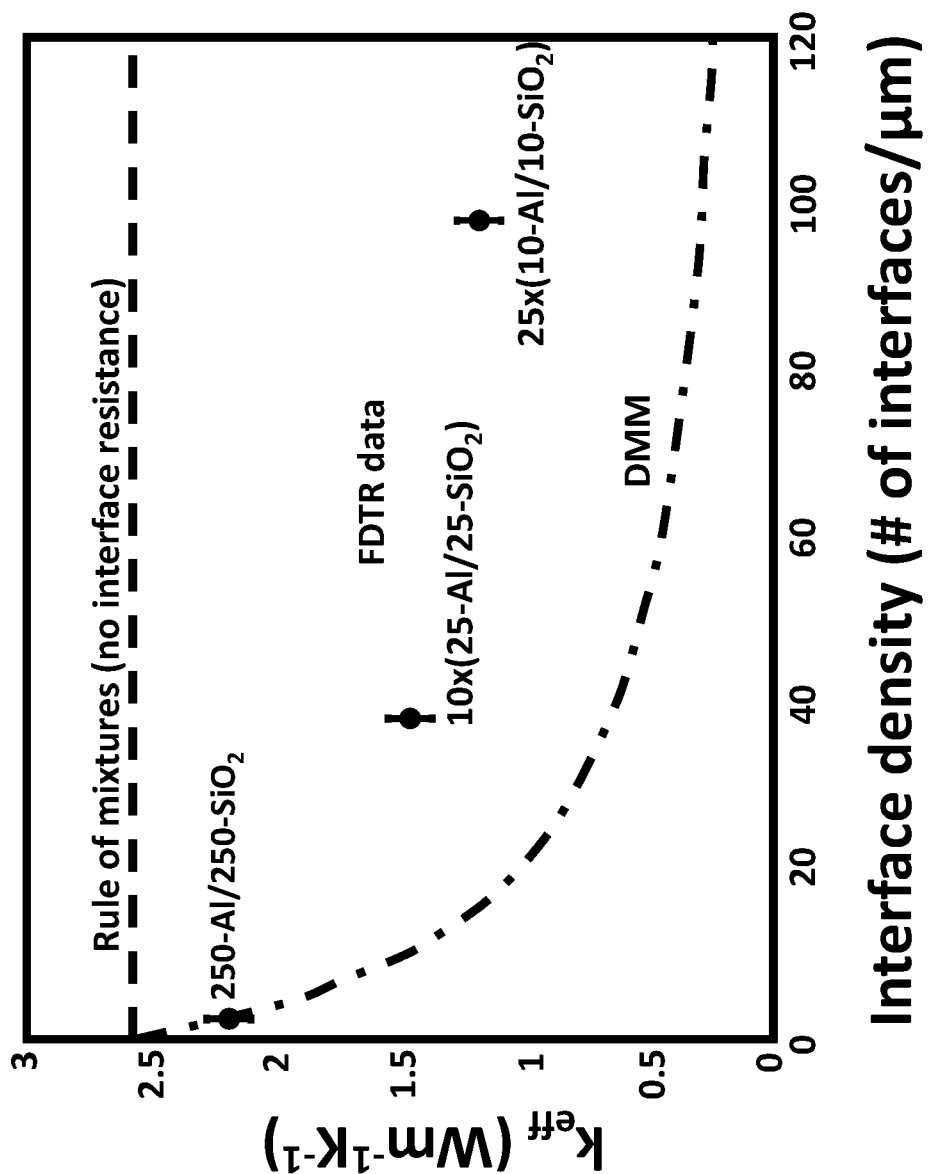
FIG. 4 is a graph showing the measured effective thermal conductivity as a function of interface density, which demonstrates the effect of adding interfaces to a nanolaminate for use with some of the embodiments disclosed herein.
Figure 5:
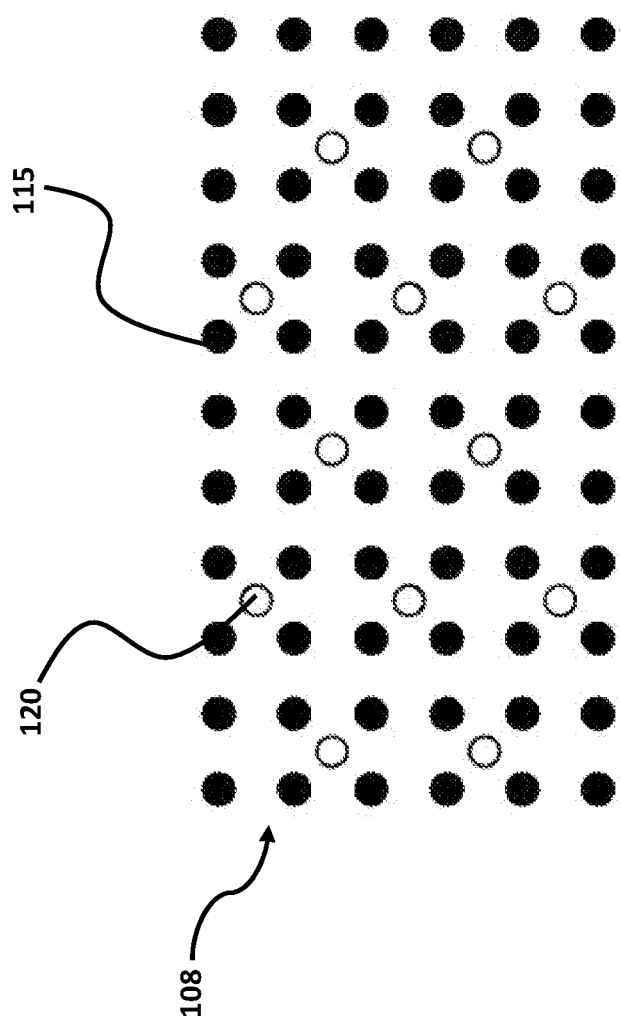
FIG. 5 is a schematic diagram illustrating an intentionally-introduced dopant in a material for forming phonon transport disrupting structures in an electrically conductive path in accordance with some of the embodiments disclosed herein.
Figure 6:
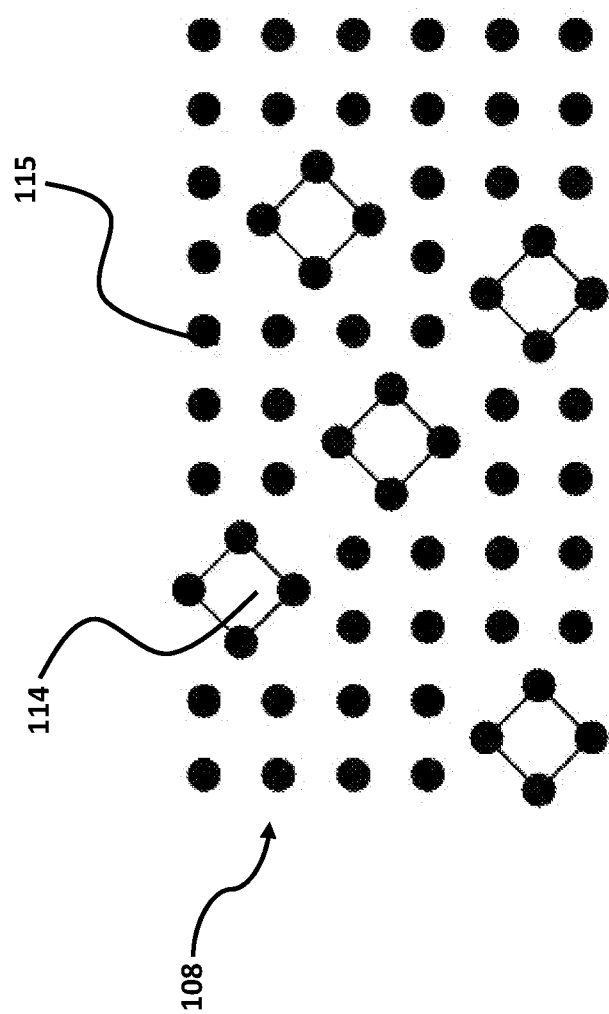
FIG. 6 is a schematic diagram illustrating intentionally-introduced defects in a material for forming phonon transport disrupting structures in an electrically conductive path in accordance with some of the embodiments disclosed herein.
Figure 7:
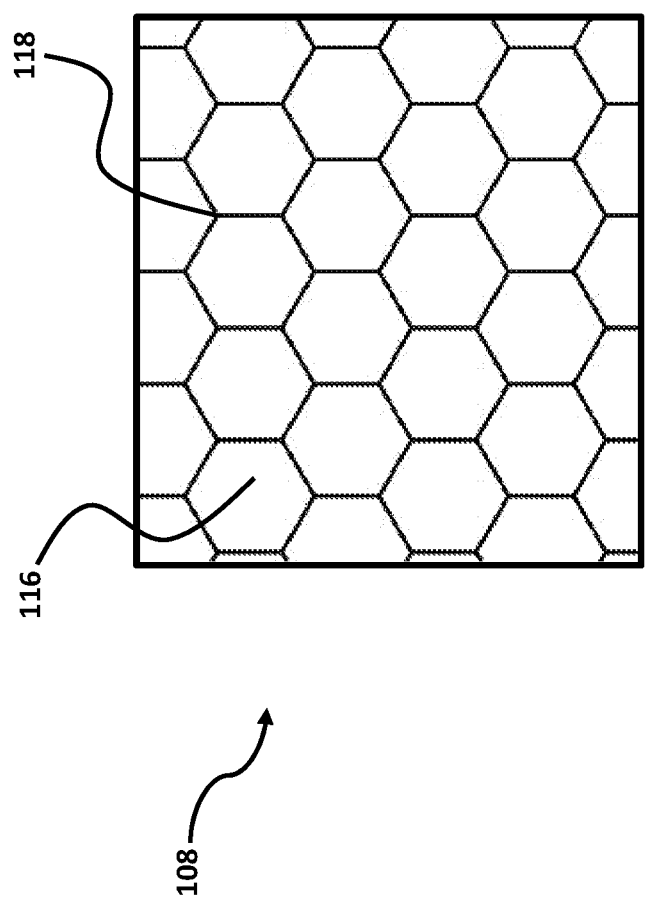
FIG. 7 is a schematic diagram illustrating a material having fine crystalline grains with sharply defined boundaries that form phonon transport disrupting structures in an electrically conductive path in accordance with some of the embodiments disclosed herein.
Figure 8:
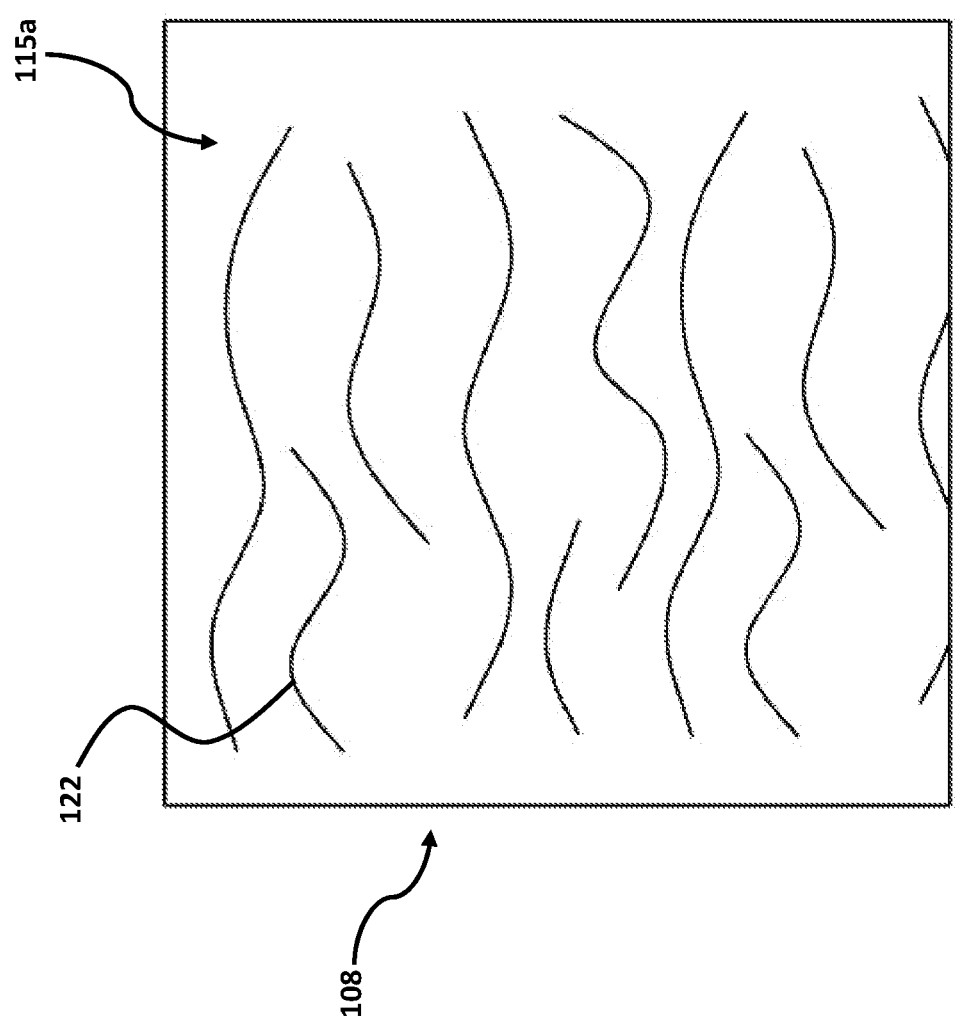
FIG. 8 is a schematic diagram illustrating a conductive polymer material that forms the phonon transport disrupting structure in an electrically conductive path in accordance with some of the embodiments disclosed herein.
Figure 9:
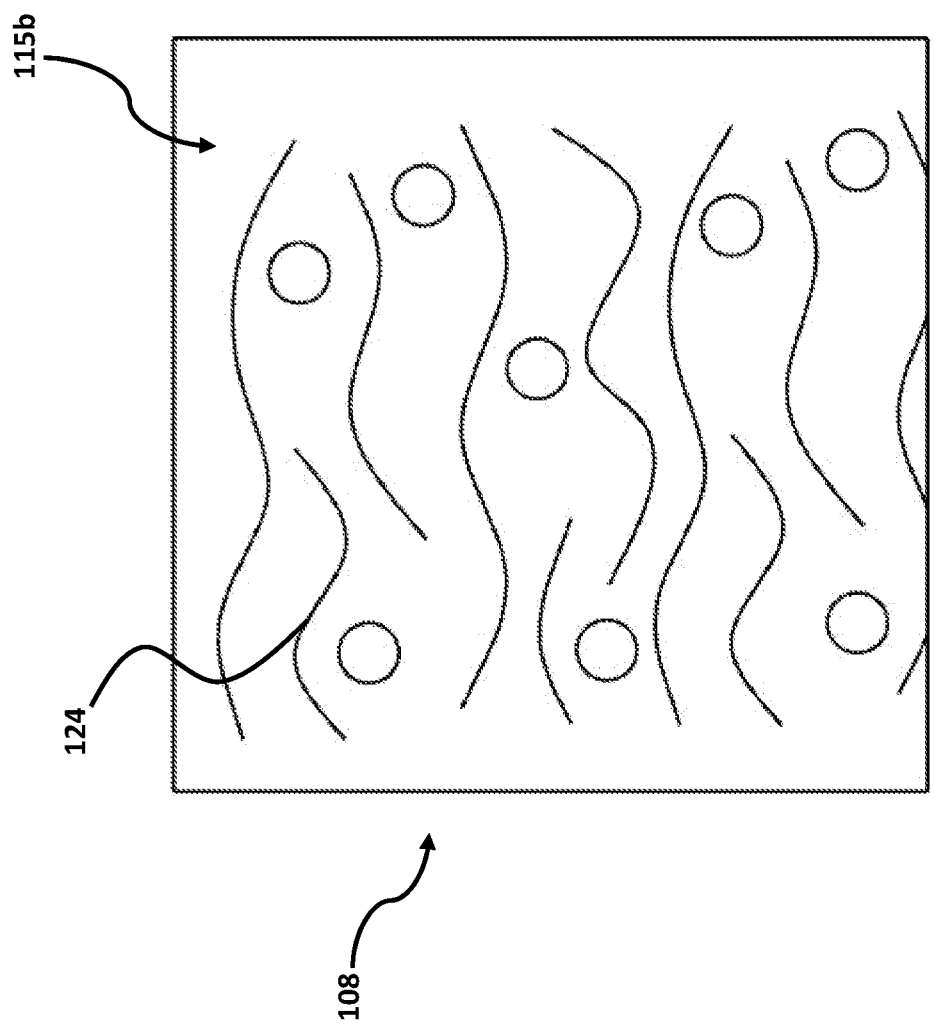
FIG. 9 is a schematic diagram illustrating a doped polymer material that forms the phonon transport disrupting structure in an electrically conductive path in accordance with some of the embodiments disclosed herein.

Thermal conductivity was measured for each of these film stacks by Frequency-Domain Thermoreflectance (the method is described in detail in the paper incorporated by reference herein above). FIG. 4 depicts the experimentally determined results and compares those results with the case where there is no interface resistance present and the case where there is diffuse scattering at every interface. The experimentally observed value falls between the other two but represents a ~2.5× reduction in thermal conductance compared with the case where there is no interface thermal resistance present, whereas if diffusive scattering can be ensured at every interface, the reduction in thermal conductivity would increase up to ~7.5×.

The use of nanolaminates to increase thermal resistance of interconnects in thermal sensors is one of several strategies employed by the embodiments herein to increase the sensitivity of thermal sensors. Other strategies employed in the embodiments herein include:
  Nano-bulk composite materials
  Materials with nanocrystalline grains and sharp grain boundaries (which will promote diffusive scattering and reflections at the interface)
  Conductive and doped polymers
  Skutterudite materials (comprised of molecules with a trapped ion which inhibits certain phonon modes, but still allows electron transport)
  Materials with larger density differences
  Metamaterial formation to cut into phonon mean free path size scales
  Topologically protected materials (which allow electrons to flow without scattering at defects, but follows conventional physics for heat transfer)
  Any other strategy that is processing-compatible and inhibits heat flow while allowing flow of electrons.

Electron transport is likely to suffer some deleterious effects due to the size restrictions aimed at reducing thermal conductivity. In many systems, electrons can become trapped in a Schottky barrier. Therefore, selecting material pairs that maintain Ohmic contact between the sensor and the read-out integrated circuit will be critical to maintain device function. Good mobility of the active layer will also be critical to maintain acceptable 1/f noise. Materials selected for laminates for thermal sensor applications should exhibit these characteristics while also exhibiting a strong phononic contribution to thermal conductivity.

Thermal sensors rely on the absorption of thermal energy and subsequent translation to measurable signal. This is enhanced when the sensing element experiences a larger temperature change for a given amount of absorbed thermal energy. Standard practices to enhance performance have relied on material selection and design of geometry. In the embodiments disclosed herein, intentional introduction of phonon-scattering mechanisms (such as interfaces, dopants, defects, and nanoscale grain boundaries) allow for the enhancement of thermal resistance without sacrificing electrical performance. This is achieved by selecting the scattering mechanism to be comparable with the phonon mean free path, but larger than the electron mean free path in the material. By disrupting phonon heat transfer, the thermal resistance in thermal sensors may experience significant enhancement, leading to higher performance; improved size, weight, power consumption, and cost; and faster speeds.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A thermal sensor device comprising:
  a substrate;
  read-out circuitry;
  a thermal sensor element supported over the substrate; and
  at least one electrically conductive leg extending between the thermal sensor element and the read-out circuitry which supports the thermal sensor element over the substrate and having at least one conductive path configured to conduct an electrical signal between the thermal sensor element and the read-out circuitry, the at least one electrically conductive leg comprising at least one conductive path of enhanced thermal resistance extending between the thermal sensor element and the read-out circuitry configured for conducting an electrical signal between the thermal sensor element and the read-out circuitry, the conductive path of enhanced thermal resistance having a thermal resistance,
  wherein the conductive path of enhanced thermal resistance comprises:
    a first material; and
    at least one phonon transport disrupting structure configured to increase the thermal resistance of the conductive path of enhanced thermal resistance compared to a similar conductive path, which would be made of the first material, would be configured for conducting an electrical signal between the thermal sensor element and the read-out circuitry, but would lack the phonon transport disrupting structure, wherein the similar conductive path would be identical in geometry to the conductive path of enhanced thermal resistance.

2. The device of claim 1, wherein the conduction of the electrical signal through the conductive path of enhanced thermal resistance is at least in part due to the transport of conduction electrons through the conductive path of enhanced thermal resistance, wherein the conduction electrons of the conductive path of enhanced thermal resistance have a mean free path having a size scale, and wherein the phonon transport disrupting structure is on a size scale that is larger than the size scale of the mean free path of the conduction electrons in the conductive path of enhanced thermal resistance so as to reduce any deleterious effect of the phonon transport disrupting structure on the conduction of the electrical signal through the conductive path of enhanced thermal resistance.

3. The device of claim 1, wherein the conductive path of enhanced thermal resistance comprises a plurality of phonon transport disrupting structures configured to increase the thermal resistance of the conductive path of enhanced thermal resistance as compared to the similar conductive path.

4. The device of claim 2, wherein heat transfer through the conductive path of enhanced thermal resistance is at least in part due to the transport of phonons through the conductive path of enhanced thermal resistance, wherein the phonons of the conductive path of enhanced thermal resistance have a mean free path having a size scale, and wherein the phonon transport disrupting structure is on the size scale of the mean free path of the phonons in the conductive path of enhanced thermal resistance so as to increase scattering and transport disruption of the phonons through the conductive path of enhanced thermal resistance.

5. The device of claim 3, wherein the conduction of the electrical signal through the conductive path of enhanced thermal resistance is at least in part due to the transport of conduction electrons through the conductive path of enhanced thermal resistance, wherein the conduction electrons of the conductive path of enhanced thermal resistance have a mean free path having a size scale, and wherein the plurality of phonon transport disrupting structures are at least on average on a size scale that is larger than the size scale of the mean free path of the conduction electrons in the conductive path of enhanced thermal resistance so as to reduce any deleterious effect of the plurality of phonon transport disrupting structures on the conduction of the electrical signal through the conductive path of enhanced thermal resistance.

6. The device of claim 3, wherein the conduction of the electrical signal through the conductive path of enhanced thermal resistance is at least in part due to the transport of conduction electrons through the conductive path of enhanced thermal resistance, and wherein the plurality of phonon transport disrupting structures comprise structural features selected from the group consisting of:
(a) dissimilar material interfaces formed by a stack of alternating layers of the first material and a second material, wherein the thickness of each of the layers is selected so as to cause scattering of phonons while not significantly inhibiting the transport of conduction electrons through the conductive path of enhanced thermal resistance;
(b) defects within the first material that are tailored to cause scattering of phonons while not significantly inhibiting the transport of conduction electrons through the conductive path of enhanced thermal resistance;
(c) nanocrystalline grains having sharp grain boundaries of an average grain size selected so as to promote scattering of phonons at the grain boundaries while not significantly inhibiting the transport of conduction electrons through the conductive path of enhanced thermal resistance;
(d) dopants incorporated into the first material and selected so as to cause scattering of phonons while not significantly inhibiting the transport of conduction electrons through the conductive path of enhanced thermal resistance;
(e) conductive polymers used as the first material or in conjunction with the first material in the conductive path of enhanced thermal resistance and configured to cause scattering of phonons while not significantly inhibiting the transport of conduction electrons through the conductive path of enhanced thermal resistance;
(f) doped polymers used as the first material or in conjunction with the first material in the conductive path of enhanced thermal resistance and configured to cause scattering of phonons while not significantly inhibiting the transport of conduction electrons through the conductive path of enhanced thermal resistance; and
(g) any combination of the structural features (a) through (f).

7. The device of claim 3, wherein the conduction of the electrical signal through the conductive path of enhanced thermal resistance is at least in part due to the transport of conduction electrons through the conductive path of enhanced thermal resistance, and wherein the plurality of phonon transport disrupting structures comprise dissimilar material interfaces formed by a stack of alternating layers of the first material and a second material, wherein the thickness of each of the layers is selected so as to cause scattering of phonons while not significantly inhibiting the transport of conduction electrons through the conductive path of enhanced thermal resistance.

8. The device of claim 5, wherein heat transfer through the conductive path of enhanced thermal resistance is at least in part due to the transport of phonons through the conductive path of enhanced thermal resistance, wherein the phonons of the conductive path of enhanced thermal resistance have a mean free path having a size scale, and wherein the plurality of phonon transport disrupting structures are at least on average on the size scale of the mean free path of the phonons in the conductive path of enhanced thermal resistance so as to increase scattering and transport disruption of the phonons through the conductive path of enhanced thermal resistance.

9. The device of claim 7, wherein the plurality of phonon transport disrupting structures comprise dissimilar material interfaces formed by a nanolaminate stack of alternating layers of the first material and the second material, wherein the first material is aluminum, and the second material is silicon dioxide.

10. The device of claim 7, wherein the thickness of each of the layers is in the range of from about 5 nm to about 50 nm.

11. The device of claim 7, wherein the plurality of phonon transport disrupting structures comprise dissimilar material interfaces formed by a nanolaminate stack of alternating layers of the first material and the second material, wherein the first material is tungsten, and the second material is formed from one or more oxides of vanadium.

12. A thermal sensor device comprising:
a substrate;
read-out circuitry;
a thermal sensor element supported over the substrate; and
at least one electrically conductive leg extending between the thermal sensor element and the read-out circuitry which supports the thermal sensor element over the substrate and having at least one conductive path configured to conduct an electrical signal between the thermal sensor element and the read-out circuitry, the at least one electrically conductive leg comprising at least one conductive path of enhanced thermal resistance extending between the thermal sensor element and the read-out circuitry configured for conducting an electrical signal between the thermal sensor element and the read-out circuitry, the conductive path of enhanced thermal resistance having a thermal resistance, wherein the conductive path of enhanced thermal resistance comprises at least one material selected from the group consisting of:
   (a) material having nanocrystalline grains having sharp grain boundaries of an average grain size selected so as to promote scattering of phonons at the grain boundaries while not significantly inhibiting the transport of conduction electrons through the conductive path of enhanced thermal resistance;
   (b) conductive polymers configured to cause scattering of phonons while not significantly inhibiting the transport of conduction electrons through the conductive path of enhanced thermal resistance;
   (c) doped polymers configured to cause scattering of phonons while not significantly inhibiting the transport of conduction electrons through the conductive path of enhanced thermal resistance;
   (d) materials exhibiting surface mode electrical conduction; and
   (e) any combination of the materials (a) through (d).

13. A method for forming a conductive path of enhanced thermal resistance in an electronic device, the method comprising:
   providing at least one electrically conductive leg extending between the thermal sensor element and the read-out circuitry which supports the thermal sensor element over the substrate and having at least one conductive path configured to conduct an electrical signal between the thermal sensor element and the read-out circuitry, the at least one electrically conductive leg comprising a conductive path comprising a first material as part of the electronic device; and
   forming, as part of the conductive path, one or more phonon transport disrupting structures configured to increase the thermal resistance of the conductive path in order to provide a conductive path of enhanced thermal resistance compared to a similar conductive path, which would be made of the first material, would be configured for conducting an electrical signal between the thermal sensor element and the read-out circuitry, but would lack the phonon transport disrupting structures, and wherein the similar conductive path would be identical in geometry to the conductive path of enhanced thermal resistance.

14. The method of claim 13, wherein the conduction of the electrical signal through the conductive path of enhanced thermal resistance is at least in part due to the transport of conduction electrons through the conductive path of enhanced thermal resistance, and wherein forming the phonon transport disrupting structures comprises forming a stack of alternating layers of the first material and a second material, wherein the thickness of each of the layers is selected so as to cause scattering of phonons while not significantly inhibiting the transport of conduction electrons through the conductive path of enhanced thermal resistance.

15. The method of claim 13, wherein forming the phonon transport disrupting structures comprises introducing defects into the first material that are tailored to cause scattering of phonons while not significantly inhibiting the transport of conduction electrons through the conductive path of enhanced thermal resistance.

16. The method of claim 13, wherein forming the phonon transport disrupting structures comprises providing for the first material to include nanocrystalline grains having sharp grain boundaries of an average grain size selected so as to promote scattering of phonons at the grain boundaries while not significantly inhibiting the transport of conduction electrons through the conductive path of enhanced thermal resistance.

17. The method of claim 13, wherein forming the phonon transport disrupting structures comprises introducing dopants into the first material, wherein the dopants are of the same type or of a variety of types, and wherein the type or types of dopant are selected so as to cause scattering of phonons while not significantly inhibiting the transport of conduction electrons through the conductive path of enhanced thermal resistance.

18. The method of claim 13, wherein forming the phonon transport disrupting structures comprises forming the conductive path of enhanced thermal resistance at least in part from a conductive or doped polymer, and wherein the conductive or doped polymer is configured to cause scattering of phonons while not significantly inhibiting the transport of conduction electrons through the conductive path of enhanced thermal resistance.

19. The method of claim 14, wherein forming the phonon transport disrupting structures comprises forming a nanolaminate stack of alternating layers of the first material and the second material, wherein the first material is aluminum, and the second material is silicon dioxide.

20. The method of claim 14, wherein forming the phonon transport disrupting structures comprises forming a nanolaminate stack of alternating layers of the first material and the second material, wherein the first material is tungsten, and the second material is formed from one or more oxides of vanadium.

\* \* \* \* \*